March 12, 1968  A. E. JUNGE ET AL  3,373,064
APPARATUS FOR SINGLE SURFACE ETCHING OF GLASS PLATES
Filed Aug. 4, 1964  2 Sheets-Sheet 1
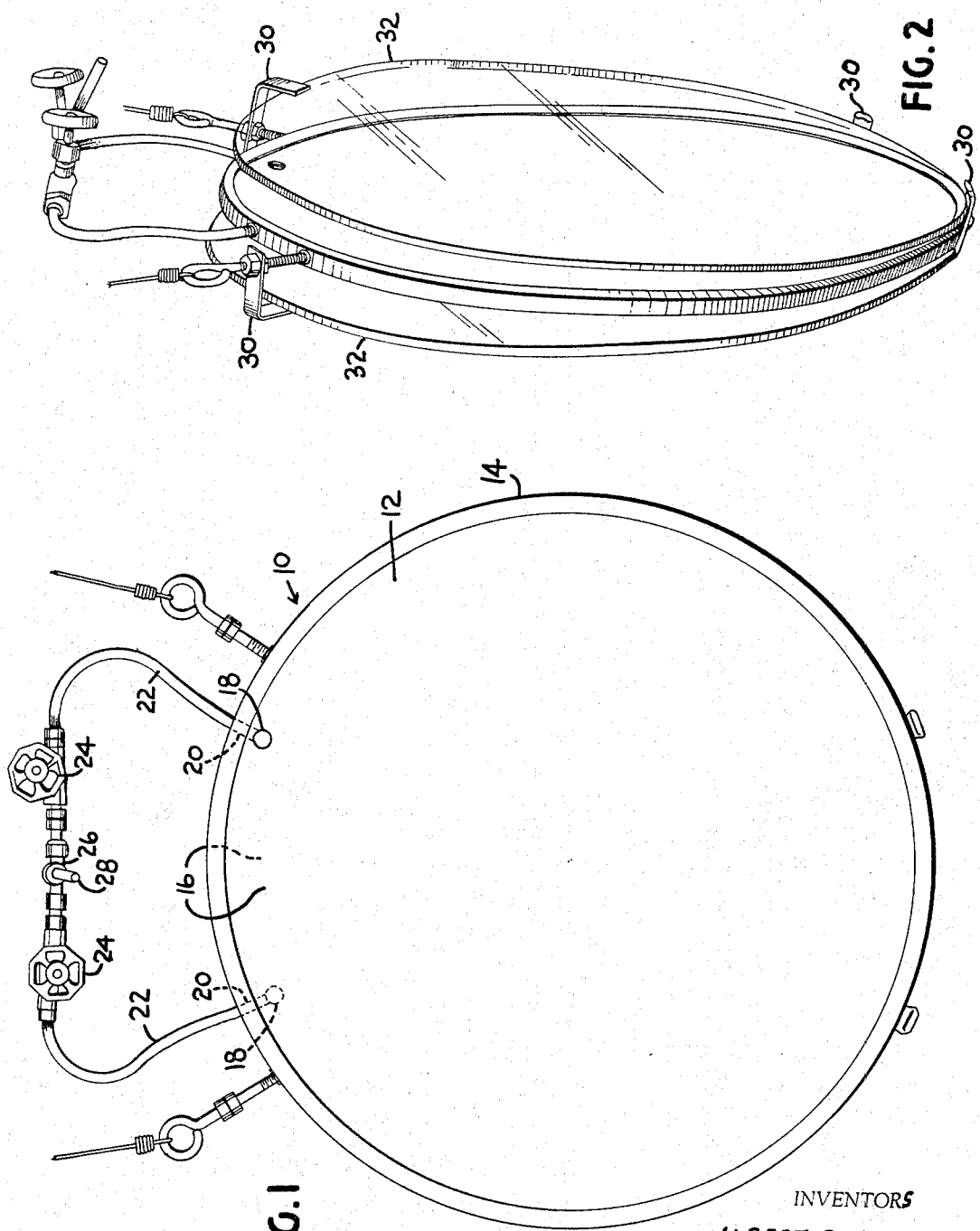
INVENTORS
ALBERT E. JUNGE and
JOSEPH CHABAL
Chisholm and Spencer
ATTORNEYS March 12, 1968  A. E. JUNGE ET AL  3,373,064
APPARATUS FOR SINGLE SURFACE ETCHING OF GLASS PLATES
Filed Aug. 4, 1964  2 Sheets-Sheet 2

INVENTORS
ALBERT E. JUNGE
JOSEPH CHABAL

Chisholm and Spencer
ATTORNEYS 3,373,064
APPARATUS FOR SINGLE SURFACE ETCHING OF GLASS PLATES
Albert E. Junge, New Kensington, and Joseph Chabal, Curtisville, Pa., assignors to Pittsburgh Plate Glass Company, Pittsburgh, Pa., a corporation of Pennsylvania
Filed Aug. 4, 1964, Ser. No. 387,392
3 Claims. (Cl. 156—34.5)

ABSTRACT OF THE DISCLOSURE

This invention relates to a method and apparatus for etching, and in particular to a method and apparatus for etching only selected surface portions of an article while the article is immersed in a bath of etching solution. More specifically, the present invention relates to a method and apparatus for completely etching only a single major surface of flat glass articles while immersed in a bath of acid etching solution and to a novel manufacture employing the use of the etched article thus obtained. More particularly, the invention relates to an apparatus comprising an impervious or etch resistance protective seal disposed between the faces of a pair of glass plates to be etched in such a manner to form a void and means for creating a vacuum within the void formed by the gasket and plates.

---

In present-day commercial production of sheet and plate glass, the polished surfaces that are produced generally exhibit a high degree of specular (mirror-like) reflection. This high specular reflection characteristic of smooth glass surfaces is ofen quite objectionable, such as when the glass is to be used as a cover for a framed picture, as a cover on a desk or as a faceplate or an implosion plate for a television picture tube.

Generally, objects are seen by light emitted by or reflected from them reaching the eye of the observer. A picture or photograph, for example, is seen only because light is reflected from it. The details of the picture are seen because of variations in the amount of light reflected from various areas of the picture. The observer does not want any interference or distortion in the light reflected from the picture he is viewing.

Under many viewing conditions, the presence of glass having smooth surfaces in front of a picture is not noticeable, but under some circumstances the observer's attention is distracted by specular images reflected by the smooth surfaces. This distraction results because the eye involuntarily comes to focus on the images reflected by the smooth glass surfaces rather than on the picture behind the glass. The reflected image may be of many sources, e.g., brilliantly illuminated objects outside a window, the image of an object inside the building but brilliantly illuminated by direct sunlight through a window, or a lighted lamp which emits light much brighter than the light reflected from surrounding objects. The light reflected by the picture to the eye must be greater than the light reflected from the glass surfaces to the eye in order for the observer to satisfactorily see and enjoy the picture.

The application of a chemical or mechanical treatment to the smooth surfaces of glass sheets to diffuse the specular reflection will eliminate the distraction of the specularly reflected image. One convenient chemical treatment that can be applied to the smooth surfaces of glass sheets to diffuse the specular reflection involves etching the glass by immersing it in a solution containing hydrofluoric acid. Such processes are well known in the prior art. However, when employing a chemical etch, it has always heretofore been throught necessary and/or desirable to etch both major surfaces of a glass sheet or plate.

The present invention has discovered that a double surface etch in many instances is neither necessary nor desirable. For example, in the case of picture glass, glass tops for desks, glass television implosion plates, and the like, a single surface etch produced on the glass surface nearest to the observer is frequently all that is necessary in order to produce good viewing under light conditions that would normally produce a high degree of specular reflection on smooth glass surfaces. In particular, in the instance of a television implosion plate that is laminated to the face-plate of a television picture tube, the ability of an etch produced on the glass surface nearest the picture tube to diffuse light is, in fact, nullified by the resinous laminating material employed. A resinous laminating material having substantially the same index of refraction as the glass is used and results in a "washing out" or "filling in" of the etched surface in contact therewith. Furthermore, where the glass is mounted in front of the object being viewed, the use of double etched surfaces can result in double diffusion of the light being reflected or emitted from the viewed object. This double diffusion or double scattering of light rays tends to interfere with the ability to resolve the details of the object being viewed.

The present invention also makes possible a substantial savings in the cost of etching solution and the labor costs involved in preparing etching solution by conserving or making more efficient use of the etching solution that is employed.

In accordance with the present invention, flat glass articles are completely etched on only one major surface while the glass articles are completely immersed in a bath of etching solution. Briefly, this is accomplished by applying an etch imeprvious or etch resistant protective seal for one major surface of the glass article prior to submerging the glass article in the bath of acid etching solution. Thereby, etching is produced only on the unprotected portions of the glass article. Preferably, this procedure is facilitated by the use of a vacuum operated jig, comprising essentially a vacuum chamber of suitable dimensions, a vacuum supply means and an acid or etch impervious sealing means. The vacuum jig is applied to one major surface of the flat glass article to be etched to support the glass and to protect the portions of the glass article facing its sealed vacuum chamber. All of the components of the vacuum jig are composed of materials that resist attack by the acid etching solution. The single surface etched articles produced by the practice of the present invention can be used as light diffusing enclosures or cover plates for a wide variety of objects, and have particular application as television implosion plates.

This invention may be better understood in connection with the accompanying drawings wherein:

FIG. 1 is a front elevation of a preferred vacuum jig constructed in accordance with the present invention.

FIG. 2 is a perspective of the vacuum jig of FIG. 1 showing a pair of glass sheets being initially positioned on the jig prior to being brought into contact with its vacuum chambers.

Figure 3:
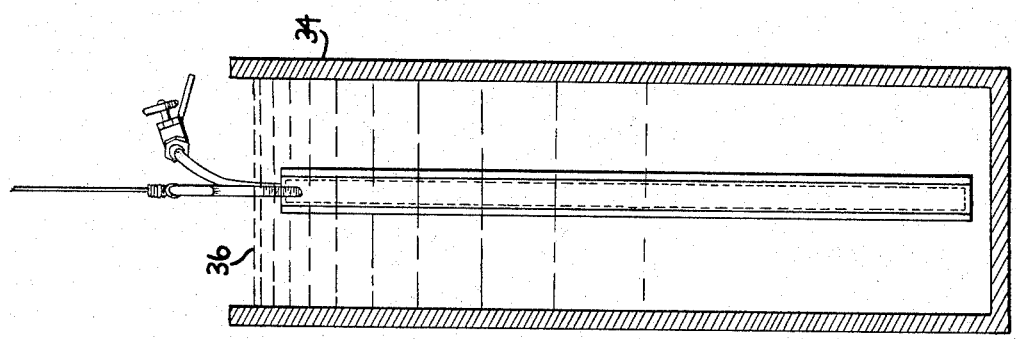
FIG. 3 is a schematic representation of the vacuum jig and a pair of glass sheets while immersed in a tank of acid etching solution.

Referring now to the drawings, and in particular to FIGS. 1 to 3, there is shown a vacuum jig indicated generally at 10 comprising a metal disc 12 that is 21 inches in diameter and ⅜ inch thick. Attached to the periphery of the disc 12 is assembled a continuous neoprene channel-type gasket 14. The neoprene gasket 14 extends a slight distance beyond each side of the disc 12 to create a pair of cylindrical vacuum chambers 16. On each side of the disc 12 and below the neoprene channel 14 is a ¼ inch diameter hole 18 partially drilled through. Each of these holes 18, in turn, is provided with a communicating hole 20 drilled through the neoprene gasket 14 and the edge of the metal disc 12. A vacuum supply line 22 having a suitable control valve 24 is attached and sealed to each of the latter holes 20. These vacuum supply lines 22 are then joined in a T connection 26 and communicate via one leg 28 thereof with a vacuum source (not shown). Glass supporting fingers 30 are provided on the jig 10 to assist in initially positioning the glass sheets 32 on the jig and to prevent the glass sheets 32 from falling into the etching tank 34 in the event of vacuum failure.

In operation, the glass sheets 32 to be etched, e.g., circular glass sheets 21 inches in diameter and ⅛ inch thick, for use as television implosion plates, are conditioned for the etch by being first cut to shape, seamed along the edges, washed and then conveyed to the etching station in a conventional manner. A treating tank assembly 34, such as that disclosed in application Ser. No. 316,718, filed Oct. 16, 1963, and assigned to the assignee of the present invention, is located at the etching station. An acid etch solution 36, such as that disclosed in application Ser. No. 247,390, filed Dec. 26, 1962, now abandoned and assigned to the assignee of the present invention, is contained within the treating tank or vessel 34.

A glass sheet 32 is pressed against the neoprene channel seal 14 on each side of the vertically disposed vacuum jig 10 and held in position. The vacuum is turned on and the glass sheets 32 are securely held and sealed in position for etching. A vacuum of 10 to 15 inches of mercury has been successfully employed when utilizing the apparatus and method as described herein.

The vertically disposed glass sheets 32 are then lowered in a conventional manner into the etching solution 36, containing hydrofluoric acid, through the top surface of the bath. The glass sheets 32 are lowered into the solution 36 and maintained therein for approximately 5 to 60 seconds, depending upon the degree of etch desired. During this time, the etching solution 36 is continuously agitated by impeller means (not shown) to assure uniform etching over the entire unprotected surface of the glass sheets 32.

After the etching is complete, the glass sheets 32 are removed from the treating tank 34 and the vacuum jig 10 and taken to a rinsing station where they are washed and dried. Thereafter, the sheets 32 may be further processed, for example, by bending and tempering, as in the case of television implosion plates.

Figure 4:
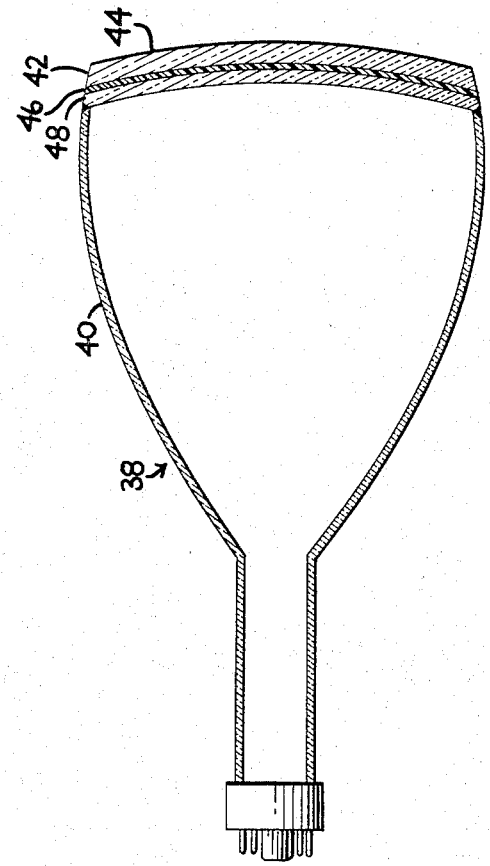
FIG. 4 is a schematic representation of a television picture tube having an implosion plate with a single etched surface laminated thereto.

In addition to the apparatus and method described above, the present invention provides a novel manufacture employing the use of the single surface etched articles produced thereby. As shown in FIG. 4, the present invention contemplates a novel television picture tube assembly 38 comprising a picture tube 40 and a glass implosion plate 42 having an etched outer surface 44 only. The etched implosion plate 42 is laminated to the picture tube 40 by means of a resinous laminating material 46 having an index of refraction that is substantially the same as that of the glass used in the picture tube faceplate 48 and the implosion plate 42. The television picture tube assembly 38, of the present invention, is less expensive to manufacture and is equally as efficient in reducing specular reflection as is its counterpart that employs an implosion plate etched on both sides.

From the above description of specific embodiments of the present invention, it will be readily apparent to those skilled in the art that various modifications may be made without departing from the spirit of the invention. For example, various materials, arrangements of parts and components within the range of equivalents other than those specifically mentioned may be employed in the construction of a suitable etching jig. Also, the outline, angular disposition and contour of the etching jig may be varied to better facilitate glass sheets or other objects of different shapes than those shown. The only requirement of the present invention is that the jig be capable of supporting one or more similar articles while providing an etch impervious seal to protect one major surface of each of the articles from contact with the acid etching solution during immersion. Furthermore, while the present invention discloses etching a pair of glass sheets simultaneously, it should be obvious that the apparatus and method of the present invention are equally well adapted to the treating of a single glass sheet or other article, if desired.

While the present invention has been described with reference to the specific details of certain embodiments, it is not intended that such details shall be regarded as limitations on the scope of the invention, except insofar as included in the accompanying claims.

We claim:
1. Apparatus for protecting at least a portion of one surface area of each of the pair of flat articles disposed on either side of said apparatus while the articles are completely immersed in an acid etching solution comprising
    (a) a continuous, acid-impervious sealing gasket disposed about the periphery of a rigid, flat member and extending above the surface of each side of said member in such a manner that a hollow chamber is formed on each side of said member;
    (b) a vacuum supply means extending into each chamber encompassed by said sealing gasket; and
    (c) a source of vacuum connected to said vacuum supply means.
2. The apparatus of claim 1 wherein the continuous acid impervious sealing gasket comprises a metal disk of slightly smaller dimensions than the articles to be etched and a neoprene gasket enclosing the periphery of said disk and extending a slight distance beyond each side of the disk.
3. The apparatus of claim 2 wherein the gasket is a channel-shaped, neoprene gasket which encloses the periphery of the disk and covers a portion of each face of the disk adjacent to its peripheral edge.

References Cited

UNITED STATES PATENTS

| | | | |
|---|---|---|---|
| 881,915 | 3/1908 | Farnham | 156—345 |
| 2,248,143 | 7/1941 | Weber | 51—235 |
| 2,426,541 | 8/1947 | Williams | 156—24 |
| 2,461,840 | 2/1949 | Nicoll | 156—24 |
| 2,820,312 | 1/1958 | Coontz | 156—345 |

JACOB H. STEINBERG, *Primary Examiner.*